United States Patent Office 2,718,529
Patented Sept. 20, 1955

2,718,529

HYDROXYLATION OF UNSATURATED ALDEHYDES

Curtis W. Smith and Roy T. Holm, Berkeley, Calif., assignors to Shell Development Company, Emeryville, Calif., a corporation of Delaware No Drawing. Application June 28, 1952,
Serial No. 296,242

10 Claims. (Cl. 260—602)

This invention relates to the production of polyhydroxyaldehydes from the corresponding olefinic aldehydes. It deals with a new method of producing these aldehydes by reacting the olefinic aldehydes with a peroxide hydroxylating agent under the catalytic influence of osmium oxide.

It is known that unsaturated aldehydes can be hydroxylated by reaction with suitable chlorates. Thus, Neuberg describes in Biochem. Zeit., vol. 255, pages 1–26 (1932), the production of glyceraldehyde by reacting acrolein with sodium chlorate at —8° C. to 0° C. However, not only is this method more expensive than would be the case if peroxides could be successfully used as hydroxylating agents, but also it is complicated by a tendency to form chlorine-containing by-products which have to be removed from the product. The attempts which have hitherto been made to use peroxides as hydroxylating agents for unsaturated aldehydes have resulted in the production of acid compounds as the chief product with more or less concomitant polymerization. Weitz, Berichte, vol. 54B, pages 2327–44 (1921), reports acid products from the reaction of alkaline hydrogen peroxide with cinnamyl aldehyde or crotonaldehyde. Mugdan and Young, Journal of the Chemical Society, November 1949, pages 2988–3000, show dihydroxy butyric, crotonic and other acids as the products of reaction of crotonaldehyde with hydrogen peroxide. It is also pointed out in British Patent 654,764 of The Distillers Company (page 2, lines 29–34) that olefinic aldehydes are oxidized simultaneously to their corresponding acids during hydroxylation with hydrogen peroxide. As a result of these and other drawbacks of the prior methods, no satisfactory process has been available for the commercial scale hydroxylation of olefinic aldehydes.

It is an object of the present invention to overcome the foregoing difficulties in hydroxylating olefinic aldehydes. An important object is to provide an efficient and economical method for the conversion of olefinic aldehydes to the corresponding polyhydroxy aldehydes by reaction with peroxides with minimum production of acid products. A special object of the invention is to produce high yields of alpha,beta-dihydroxy aldehydes by reacting alpha,beta-olefinic aldehydes with aqueous hydrogen peroxide. Another special object is to provide an efficient method of producing trihydroxy hydrocarbons by a combination of two novel steps comprising first hydroxylating an olefinic aldehyde and then hydrogenating the resulting dihydroxyaldehyde. Still another object of the invention is the provision of a new method of reacting olefinic aldehydes with peroxide hydroxylating agents under the catalytic influence of osmium oxide whereby the reaction can be controlled so as to effect selective addition at the olefinic double bond or bonds without attack on the aldehydic carbonyl group. Further objects and advantages of the new method will be apparent from the following description of the invention.

Extensive tests with a great many different kinds of catalysts have shown that osmium tetroxide is unique among hydroxylation catalysts in that it can be successfully used to hydroxylate olefinic aldehydes with peroxides without undesirable attack upon the aldehyde group. This new and advantageous result can only be obtained, however, by carrying out the reaction under special, carefully controlled conditions. Under the usual conditions of hydroxylation with peroxides, even when using osmium tetroxide as the catalyst, olefinic aldehydes are converted to acids and/or polymers in the same way as when other hydroxylation catalysts are used.

It has been found important to control the ratio of catalyst to peroxide in the reaction mixture. It is believed that osmium tetroxide adds to the double bond of olefinic aldehydes to form a cyclic osmium ester which is rapidly hydrolyzed by water to the dihydroxyaldehyde and osmium trioxide. This osmium trioxide is unstable and disproportionates to the tetroxide and dioxide. The osmium dioxide reacts readily with peroxides to reform the tetroxide and complete the cycle. This mechanism of the reaction is illustrated by the following equations in which acrolein and hydrogen peroxide are used to typify the olefinic aldehydes and peroxides which can be used in the process:

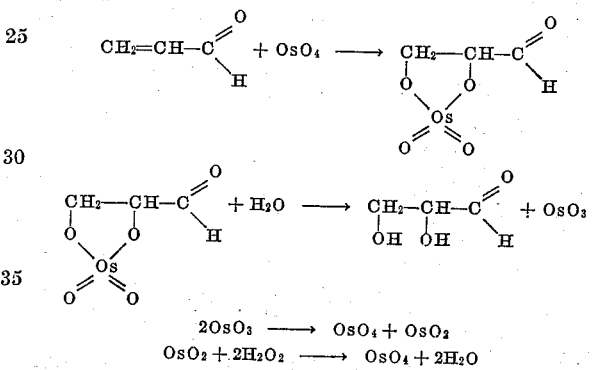

$$2 OsO_3 \longrightarrow OsO_4 + OsO_2$$
$$OsO_2 + 2 H_2O_2 \longrightarrow OsO_4 + 2 H_2O$$

Whether or not the reaction follows this or some other mechanism, the fact is that by carrying out the process so as to maintain at all times in the reaction mixture some of the lower osmium oxide ($OsO_2$), reaction of the peroxide with the carbonyl group of the olefinic aldehyde is suppressed and the formation of acid products and/or polymers is minimized and the reaction is made substantially selective for hydroxylation of the olefinic bonds of the aldehyde. By this method of operation, apparently, the presence of sufficient free peroxide in the reaction mixture to substantially react with the carbonyl group of the starting olefinic aldehyde is avoided. Instead, the peroxide reacts substantially exclusively with the osmium oxide present.

Since the lower osmium oxide ($OsO_2$) is insoluble in water, a convenient method of operation when reacting in an aqueous medium is to control the proportion of peroxide to osmium oxides in the reaction mixture so as to maintain in the mixture a detectable amount of the black precipitate which forms in the reaction. As previously pointed out, this precipitate is thought to be the lower oxide of osmium. An X-ray examination showed it to be amorphous and it is probable that its fine state of subdivision is responsible for the black color since the dioxide is reported in the literature to be a copper red. In any case, too fast addition of peroxide to the reaction mixture will lead to solution of this black precipitate with accompanying oxidation of the carbonyl group of the olefinic aldehyde by the excess free peroxide present.

The rate at which the peroxide can be added to the reaction mixture without inducing undesirable side reactions, particularly oxidation to acids and/or polymer formation, will depend upon the amount of osmium oxide used as catalyst. For best results, it is desirable to employ at least 0.25% by weight of osmium oxide, calculated as osmium tetroxide, based upon the unsaturated aldehyde being hydroxylated. More preferably, a minimum of about 0.4% by weight of osmium oxide is used. Because of the high cost of osmium oxide it is generally advantageous to employ no more than 2% by weight based on the unsaturated aldehyde since larger amounts increase the capital investment in catalyst without proportionately increasing the benefits. The catalyst can be conveniently added as osmium textroxide although other forms which can be converted to the tetroxide in the reaction mixture can be used if desired.

It has been found desirable as a general rule to employ reaction temperatures of at least 10° C. and higher temperatures of the order of about 20° C. to 50° C. are preferred. At temperatures of about 0° C. or lower the formation of acid products is promoted and this is also the case when temperatures above 100° C. are employed in the reaction. There is usually no advantage in using temperatures above about 50° C. The reaction is generally complete in about 20 minutes to 2 hours, but longer or shorter reaction periods are sometimes suitable.

It is preferred to use at least one mole of unsaturated aldehydes per mole of peroxide employed and, most preferably, an excess of unsaturated aldehyde to peroxide is used since more complete utilization of the peroxide can be achieved in this way. A mole ratio of mono-olefinic aldehyde to hydrogen peroxide of 1.1:1 to about 4:1 is usually suitable. The new process is preferably carried out in the presence of a diluent, most desirably a solvent for the olefinic aldehyde being hydroxylated. Water is an especially useful solvent and diluent in most cases, but organic solvents can be also employed where water-insoluble olefinic aldehydes are being hydroxylated. With alpha,beta-olefinic aldehydes it is desirable to use solutions in which the aldehyde concentration is not greater than about 30% in order to reduce the tendency toward polymerization prior to hydroxylation. A preferred range of concentrations for hydroxylating such olefinic aldehydes in aqueous solution is about 5% to about 20%.

The reaction can be carried out batchwise, intermittently or continuously. One suitable method of batchwise reaction is to dissolve the olefinic aldehyde to be hydroxylated in a solvent, preferably water in the case of water-soluble olefinic aldehydes, and add osmium tetroxide, preferably dissolved in the same solvent, to the solution. Where water is used as the solvent medium, the solution will turn black almost immediately due to formation of a precipitate of osmium oxide. Peroxide, preferably aqueous hydrogen peroxide, is then added slowly with stirring and preferably cooling to maintain the temperature about 25° C. to 40° C. The peroxide is added at a rate controlled so as not to destroy completely the black color of the mixture. After addition of the stoichiometric amount of peroxide required for hydroxylation or, more advantageously, slightly less than such stoichiometric amount, the addition of peroxide is discontinued and the mixture worked up for recovery of the desired final product. In continuous operation the same result can be achieved by using a plurality of reactors in series through which the solution of olefinic aldehyde is passed while the peroxide is added in each at such a rate that the presence of free peroxide, i. e. peroxide uncombined with osmium oxide, is avoided at all times. Or, more advantageously, the peroxide may be introduced at spaced points along the path of flow of the reaction mixture through a tubular or other suitable form of reactor in which proper temperatures and flow rates are maintained as previously indicated. Still other reaction methods can be used for carrying out the reaction which can be conducted at atmospheric or higher or lower pressures.

The polyhydroxyaldehyde can be recovered from the reaction mixture in any suitable manner. It is often advantageous to first separate the catalyst. Where a solvent lower boiling than the hydroxyaldehyde produced is used, the solvent can be distilled off, preferably under vacuum to obtain the product in a form which is often sufficiently pure for most technical purposes. If further purification is required, it may be effected by recrystallization of the polyhydroxyaldehyde from a suitable solvent, for example.

Where the polyhydroxyaldehyde is intended as an intermediate for further synthesis, it is often advantageous to use the hydroxylation mixture for such purpose directly without isolation of the polyhydroxyaldehyde therefrom. This is especially the case when the polyhydroxyaldehyde is to be converted to a polyhydroxyhydrocarbon by hydrogenation. Under these circumstances, advantage can be taken of the osmium oxide present in the hydroxylation mixture to promote the hydrogenation reaction. Thus, a novel feature of the invention comprises subjecting the crude reaction mixture from the previously described hydroxylation to hydrogenation to convert the aldehyde carbonyl group to a carbinol group before recovery of the product. Liquid phase hydrogenation, for example, at a temperature of the order of about 50° C. to 150° C. and a hydrogen pressure of at least about 100 p. s. i. g., or more preferably 750 to 3000 p. s. i. g., is suitable. Additional hydrogenation catalyst such, for instance, as Raney or other active forms of nickel, copper chromite, or the like can, of course, be added before carrying out the hydrogenation if faster reaction is desired. The osmium oxide is reduced in the process to osmium which can be recovered by filtration and reoxidized, and returned to the hydroxylation step of the process to act as the catalyst therein.

Any suitable peroxide hydroxylating agent can be used successfully in the new method. Most preferably, hydrogen peroxide is employed but other inorganic peroxides or organic peroxides are effective. Sodium and barium peroxides and the like are examples of other inorganic peroxides which can be used, while typical organic peroxides are, for instance, tertiary butyl peroxide or hydroperoxide, benzoyl peroxide, and the like. Mixed peroxides obtainable by partial oxidation of hydrocarbons, for example, as described in U. S. Patent 2,376,257, are another example of the peroxides which can be used as the hydroxylating agent.

The process is applicable to the hydroxylation of a wide variety of olefinic aldehydes which may be aliphatic, alicyclic or aromatic substituted aldehydes. The aldehydes may be substituted by nitro, hydroxy, ether, keto, and like groups or halogen atoms. Acrolein, crotonaldehyde, methacrolein, tiglic aldehyde, alpha-ethyl acrolein, beta - methylcrotonaldehyde, alpha,beta - dimethylcrotonaldehyde, alpha,gamma - dimethylcrotonaldehyde, beta,ethyl-crotonaldehyde, 2-hexenal, 2-ethyl-2-hexenal, alpha-isobutyl acrolein, alpha-amyl acrolein, citral, cinnamaldehyde and the like are representative of the alpha, beta-olefinic aldehydes to which the new process can be applied with special advantage because this type of olefinic aldehyde gives particular difficulty in hydroxylation by prior methods. The new process is equally successful, however, with olefinic aldehydes having the double bond further removed from the aldehyde group. Typical examples of such aldehydes which have been so used are vinyl acetaldehyde, 3-pentenal, 4-pentenal, methyl vinyl acetaldehyde, isopropenyl acetaldehyde, citronellal, rhodinal, and 2-phenyl-4-hexenal.

The following examples are illustrative of suitable methods of carrying out the new process of hydroxylating olefinic aldehydes and show some of its advantages.

*Example I*

To a solution of about 5 moles of acrolein per liter of water at room temperature was added 0.45% by weight of the acrolein of osmium tetroxide in the form of a 2% solution in water. The solution turned black almost immediately. An aqueous 34% solution of hydrogen peroxide was then added dropwise to the mixture while stirring and cooling to maintain a temperature of 25° C.–30° C. The peroxide was added over a period of two hours at such a rate as not to destroy completely the black color of the mixture. In this time about 0.88 mole of hydrogen peroxide per mole of acrolein was introduced, and titration of a sample of the reaction mixture with sodium hydroxide using phenolphthalein as indicator indicated the presence of only 0.02 equivalent of acid per mole of starting acrolein. The yield of glyceraldehyde in the process was 77.7%. The glyceraldehyde was identified as the light orange 2,4-dinitrophenylhydrazone, melting point 159° C.–160°C., which analyzed as follows:

|  | Analysis | | Theory |
| --- | --- | --- | --- |
| Percent C | 40.4 | 40.4 | 40.00 |
| Percent H | 3.7 | 3.7 | 3.73 |
| Percent N | 20.7 | 20.6 | 20.74 |

Under the same conditions, except that a lower concentration of osmium tetroxide (0.1% to 0.2% by weight of the acrolein) was employed, it was found that when the entire amount of hydrogen peroxide was added in the beginning or was added over a period of about 60 minutes at a rate such that the black precipitate was not maintained in the mixture, the product was substantially acidic polymers, presumably polyacrylic acids. Using approximately the same amount of osmium tetroxide catalyst as in the above successful run (0.48% based on the acrolein), an initial reaction temperature of 0° C., and a rate of hydrogen peroxide addition such that free peroxide was present in the mixture, the product was again chiefly acidic polymers.

*Example II*

Acrolein was hydroxylated in aqueous solution of 6.3% concentration, using 1.43% of osmium tetroxide, based on the weight of acrolein, as catalyst and a reaction temperature of 25° C.–30° C. Hydrogen peroxide (34% aqueous solution) was added in the amount of 0.9 mole per mole of acrolein during 33 minutes, the rate of addition being such that a black precipitate was visible in the mixture at all times. A yield of glyceraldehyde of about 78% was obtained.

Under the same conditions using methacrolein and crotonaldehyde, similarly good yields of alpha- and gamma-methyl glyceraldehydes, respectively, were obtained.

*Example III*

Acrolein was hydroxylated as in Example II and the reaction mixture was hydrogenated in an autoclave under 1000 p. s. i. g. of hydrogen using a temperature of 150° C. After absorption of the theoretical amount of hydrogen, the hydrogenation product was filtered to remove the reduced osmium and distilled to recover colorless, odorless glycerine of about 97% purity. By adding about 30 grams of Raney nickel per mole of glyceraldehyde in the hydroxylation product, the hydrogenation can be carried out at 85° C.–120° C. The yield of glycerol recovered by distillation is 78% based upon the starting hydrogen peroxide and acrolein.

Essentially the same yield of glycerol was obtained when using in the hydroxylation step a 15% solution of acrolein in water and 0.8% by weight of osmium tetroxide catalyst based upon the acrolein employed, the peroxide being added over a period of 45 minutes so that substantially no free peroxide was present in the reaction mixture at any time.

*Example IV*

A 10% solution in aqueous ethanol of citral, hydroxylated and hydrogenated under the conditions described in Example III, gives a good yield of 3,7-dimethyl-1,2,3,7,8-pentahydroxyoctane.

Under similar conditions using cinnamic aldehyde instead of citral, an equally good yield of alpha-phenyl glycerine is obtained.

While the hydroxylation of alpha,beta-olefinic aldehydes has been emphasized in the foregoing examples because this type of starting olefinic aldehyde offers special difficulty, it will be understood that, as previously pointed out, aldehydes having one or more double bonds further removed from the aldehyde group, can be successfully hydroxylated under similar conditions. Thus, 3,4-dihydroxypentenol can be produced from vinylacetaldehyde, and 9,10-dihydroxyoctenal can be obtained from oleic aldehyde, for example. Similarly, substituted olefinic aldehydes give good yields of substituted polyhydroxyaldehydes when reacted with peroxides according to the new method. For instance, para-methoxyphenyl glyceraldehyde is produced from para-methoxy cinnamic aldehyde, ortho-hydroxyphenyl glyceraldehyde is produced from orthohydroxy cinnamic aldehyde, and alpha-chlormethyl glycerine is produced from gamma-chlorocrotonaldehyde.

It will thus be seen that the new process is capable of wide variation. Not only can it be applied with many different kinds of olefinic aldehydes, but also the reaction conditions can be varied. The invention is therefore not restricted to the examples given by way of illustration, nor is it to be limited by any theory proposed in explanation of the improved results which are obtained by the new method.

We claim as our invention:

1. A process for producing a polyhydroxy aldehyde which comprises reacting in an aqueous medium an olefinic aldehyde with a peroxide at between about 0° C. and about 100° C. under the catalytic influence of at least 0.25% osmium tetroxide based upon the weight of said olefinic aldehyde, the peroxide being added in small increments so as to maintain in the reaction mixture throughout the reaction the color, varying from black to red, imparted by a lower oxide of osmium.

2. A process of producing a polyhydroxy aldehyde from the corresponding olefinic aldehyde which comprises adding, at a temperature between about 10° and 100° C., a peroxide hydroxylating agent to an aqueous solution of said olefinic aldehyde containing an oxide of osmium lower than the tetroxide and capable of reacting with said peroxide hydroxylating agent and present in an amount of at least 0.25% of the weight of said olefinic aldehyde, said peroxide being added to the reaction mixture in small increments so as to maintain in the reaction mixture throughout the reaction the color, varying from black to red, imparted by a lower oxide of osmium.

3. A process for producing a polyhydroxy aldehyde which comprises reacting in an aqueous medium an olefinic aldehyde with hydrogen peroxide under the catalytic influence of at least 0.25% osmium tetroxide based upon the weight of the olefinic aldehyde employed at a temperature of 20° C. to 100° C., the hydrogen peroxide being added in small increments so as to maintain in the reaction mixture throughout the reaction the color, varying from black to red, imparted by a lower oxide of osmium.

4. A process of producing an alpha,beta-dihydroxy aldehyde which comprises reacting an aqueous solution of an alpha,beta-olefinic aldehyde containing about 0.4% to about 2% of osmium tetroxide based upon the weight of olefinic aldehyde present, with hydrogen peroxide added in an amount not greater than the stoichiometric requirement for hydroxylation, at a temperature of 20° C. to 50° C. the hydrogen peroxide being added in small increments so as to maintain in the reaction mixture throughout the reaction the color, varying from black to red, imparted by a lower oxide of osmium.

5. A process in accordance with claim 4 wherein the concentration of olefinic aldehyde in the aqueous solution is between about 5% and 25% by weight.

6. A process of producing an alkyl glyceraldehyde which comprises reacting in an aqueous medium an alkyl acrolein with aqueous hydrogen peroxide at 20° C. to 50° C. in the presence of at least about 0.4% of osmium tetroxide based upon the weight of alkyl acrolein present, the hydrogen peroxide being added to the alkyl acrolein in small increments so as to maintain in the reaction mixture throughout the reaction the color, varying from black to red, imparted by a lower oxide of osmium.

7. A process in accordance with claim 6 wherein an aqueous solution of methacrolein of about 3% to about 25% concentration is reacted.

8. A process of producing glyceraldehyde which comprises reacting in an aqueous medium acrolein with aqueous hydrogen peroxide at 20° C. to 40° C. in the presence of at least 0.25% of osmium tetroxide based upon the weight of acrolein, the hydrogen peroxide being added to the acrolein in small increments so as to maintain in the reaction mixture throughout the reaction the color, varying from black to red, imparted by a lower oxide of osmium.

9. A process in accordance with claim 6 wherein an aqueous solution of acrolein of about 3% to about 25% concentration is used.

10. A process of producing glycerine which comprises reacting an aqueous solution of acrolein of 3% to about 25% concentration with hydrogen peroxide at 20° C. to 40° C. under the catalytic influence of osmium tetroxide added in an amount between about 0.4% and 2% by weight of the acrolein, said hydrogen peroxide being added to the reaction mixture in small increments so as to maintain in the mixture throughout the reaction the color, varying from black to red, imparted by a lower oxide of osmium and subjecting the resulting substantially acid-free solution of glyceraldehyde to a hydrogenation at a hydrogen pressure of 750 to 3000 p. s. i. g. and a temperature of 75° C. to 125° C.

References Cited in the file of this patent
UNITED STATES PATENTS

| | | |
|---|---|---|
| 2,351,302 | Staudinger et al. | June 13, 1944 |
| 2,377,584 | Staudinger et al. | June 5, 1945 |
| 2,414,385 | Milas | Jan. 14, 1947 |